US006449826B1

(12) United States Patent
Laine et al.

(10) Patent No.: US 6,449,826 B1
(45) Date of Patent: Sep. 17, 2002

(54) METHOD FOR ASSEMBLING AN OPTICAL ARRAY COMPRISING COAXIAL SHELLS

(75) Inventors: Robert Laine, St Wassenaar; Daniel Pelletier De Chambure, EeDen Haag, both of (FR); Claude Jamar, Saint Severin (BE); Jean-Paul Collette, Embourg (BE); Yvan Stockman, Hannut (BE); Jean-Philippe Tock, Sergy (BE)

(73) Assignees: Agence Spatiale Europeenne, Paris (FR); Universite Deliege, Liege (BE)

( * ) Notice: Subject to any disclaimer, the term of this patent is extended or adjusted under 35 U.S.C. 154(b) by 0 days.

(21) Appl. No.: 09/622,167

(22) PCT Filed: Dec. 14, 1999

(86) PCT No.: PCT/FR99/03129

§ 371 (c)(1),
(2), (4) Date: Nov. 13, 2000

(87) PCT Pub. No.: WO00/41186

PCT Pub. Date: Jul. 13, 2000

(30) Foreign Application Priority Data

Jan. 7, 1999 (FR) ........................................ 99 00085

(51) Int. Cl.[7] ........................................ B23Q 17/00
(52) U.S. Cl. ........................................ 29/407.05; 356/614
(58) Field of Search ........................................ 29/407.05, 407.1, 29/407.4; 356/624, 614

(56) References Cited

U.S. PATENT DOCUMENTS 3,657,792 A * 4/1972 Hug et al.
3,864,576 A * 2/1975 Stevenson
4,936,472 A 6/1990 Meier
4,936,968 A * 6/1990 Ohnishi et al.
4,940,319 A * 7/1990 Ueda
4,977,512 A * 12/1990 Nakagawa
5,033,074 A * 7/1991 Cotter et al.
5,532,815 A * 7/1996 Kipman et al. ..... 356/139.03 X
5,747,821 A * 5/1998 York et al.
5,926,522 A * 7/1999 McCarthy et al.
5,986,766 A * 11/1999 Koga et al. ............ 356/401 X

OTHER PUBLICATIONS

Jan. 30, 1995 X–ray Telescope Mirrors Completed "Spacelink", NASA News Release, Don Savage and Steve Ray, pp 1–3.*

"Image Degradation Due to Assembly and Alignment Errors in Conical Foil X–Ray Telescopes", by James E. Harvey, et al., Opt. Eng. 35(10) 3037–3047 (Oct. 1996).

(List continued on next page.)

*Primary Examiner*—David P. Bryant
*Assistant Examiner*—Steve Blount
(74) *Attorney, Agent, or Firm*—Sughrue Mion, PLLC

(57) ABSTRACT

The invention provides a method of assembling an optical assembly having first and second longitudinal ends and comprising N coaxial shells forming individual mirrors, each of which extends between said first and second ends and presents a first diameter at said first end and a second diameter that is greater than the first at said opposite, second end, the method comprising:

1) putting the first end of the first shell situated outermost in the optical assembly into place on a support;
2) putting the first end of the second shell which is immediately adjacent thereto in the optical assembly into place on the support inside the first shell; . . . ; and
N) putting the first end of the Nth shell which is situated innermost in the optical assembly into place on the support.

10 Claims, 2 Drawing Sheets

OTHER PUBLICATIONS

"The Status of the X–Ray Mirror Production for the ESA XMM Spacecraft" by D.de Chambure, et al., European Space Agency, European Space Research and Technology Centre, 362/SPIE vol. 2808.

"Producing the X–Ray Mirrors for ESA's XMM Spacecraft", by D. de Chambure, et al., XMM Project Team, ESA Scientific Projects Department, ESA Bulletin 89–Feb. 1997., pp. 68–79.

* cited by examiner

METHOD FOR ASSEMBLING AN OPTICAL ARRAY COMPRISING COAXIAL SHELLS

The present invention relates to a method of assembling an optical assembly having first and second longitudinal ends and comprising N coaxial shells forming individual mirrors, each of which extends between said first and second ends and presents a first diameter at said first end and a second diameter that is greater than the first at said opposite, second end, where the shells can be complete cylinders or cylindrical segments.

BACKGROUND OF THE INVENTION

Such an optical assembly is known in particular as the WOLTER I type telescope mirror in which each individual mirror is a mirror for X-rays at grazing incidence, and is in the form of a surface of revolution having a region in the form of a parabola of revolution (adjacent to the larger-diameter second end) and a region in the form of a hyperbola of revolution (adjacent to the smaller-diameter first end).

Such an assembly and its method of integration is described in an article by D. de Chambure et al. entitled “Producing the X-ray mirrors for ESA’s XMM spacecraft”, published in ESA Bulletin No. 89 of February 1997, pages 68 to 79.

During integration, each shell, starting with the center-most shell, is measured and then positioned by its second end and fixed on a support, integration being performed from the center outwards.

The optical performance of each individual shell must be optimized prior to integration, which requires manufacture to very high standards of quality.

After integration, it is possible to monitor the optical performance of each shell forming the mirror, but it is not possible to make individual corrections to each shell. Unfortunately, the integration operation gives rise to deformation of the individual mirrors, if only because of gravity.

OBJECTS AND SUMMARY OF THE INVENTION

An object of the present invention is to provide a method of interaction which makes it possible to perform measurements and possibly to make corrections each time a new shell is integrated.

The invention thus provides a method of assembling an optical assembly having first and second longitudinal ends and comprising N coaxial shells forming individual mirrors, each of which extends between said first and second ends and presents a first diameter at said first end and a second diameter that is greater than the first at said opposite, second end, the method comprising:

1) putting the first end of the first shell situated outermost in the optical assembly into place on a support;

2) putting the first end of the second shell which is immediately adjacent thereto in the optical assembly into place on the support inside the first shell; . . . ; and N) putting the first end of the Nth shell which is situated innermost in the optical assembly into place on the support.

Since the shells are integrated starting from the outermost shell and going inwards, with the shells being held on the support at least via their smaller-diameter ends, the inside surfaces of the shells, i.e. their active reflecting surfaces, remain accessible until the next shell is put into place, so it is thus possible to perform any corrective or additional operation that might be found suitable on each shell.

In particular, at least one of said installation operations comprises:

a) positioning one of said shells on the support;

b) measuring the topography of the inside surface of said shell as positioned on the support;

c) where appropriate, repositioning said shell on the support as a function of the result of said topography measurement; and c') fixing the position of said shell on the support.

In a preferred variant, at least one of said installation operations includes, after said fixing of its position on the support:

d) measuring the topography of the inside surface of said shell fixed on the support; and e) where appropriate, ion machining the inside surface of said shell.

After e), it is particularly advantageous for the method to comprise:

f) applying a reflective coating on the inside face of said shell, and optionally, after f):

g) optically verifying said shell.

In said method, said topographical measurement is preferably implemented by differential measurement by scanning both, the inside surface of said shell and a reference cylinder placed on the support in a reference position, said differential measurement being performed without making contact by means of sensors which are carried by a measurement plate whose displacements are identified relative to said reference cylinder.

At least one shell can present at least one extension to at least one of its longitudinal ends.

In the method at least one shell can be constituted by a plurality of elements extending between the first and second ends, each element occupying a portion of the outline of said shell, and said elements can present at least one extension disposed at least one of the longitudinal ends thereof and at least one of the side edges thereof.

Such extensions constitute mechanical fixing elements. At least one of said extensions disposed at a longitudinal end can constitute a baffle for attenuating parasitic light.

BRIEF DESCRIPTION OF THE DRAWINGS

Other characteristics and advantages of the invention will appear better on reading the following description given by way of non-limiting example and with reference to the accompanying drawings, in which.

MORE DETAILED DESCRIPTION

Figure 1:
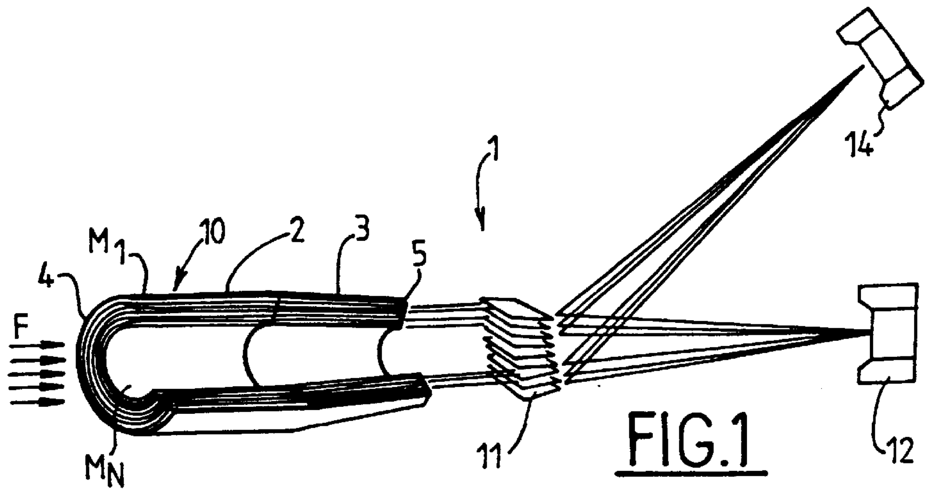
FIG. 1 shows a module for the XMM telescope.

The present trend in space astronomy is to develop optical systems having a large collecting surface area and resolution of less than 1 second of arc. In general, this implies manufacturing a large number of high quality mirrors which operate in a thermally stabilized environment, having gradients of less than 0.2° C. and at temperatures that may be as low as −80° C. One of the problems posed by such mirrors is their manufacturing cost.

The present invention proposes a method of integrating mirrors that is particularly although not exclusively suitable for an optical system 1 implementing WOLTER I type mirrors, operating in the energy band lying between 0.003 keV an 100 keV (i.e. wavelengths lying in the range 400 nm to 0.01 nm). Individual circularly symmetrical mirrors or shells ($M_1$, . . . , $M_n$) each having an inlet region 2 of parabolic section presenting an inlet end 4, and an outlet region 3 of hyperbolic section presenting an outlet end 5, are assembled together to form a module 10 of concentric mirrors sharing a common focus, with each mirror being suitable for receiving X-rays at grazing incidence in the direction of arrow F. Each individual mirror ($M_1$, . . . , $M_n$) is a thin mirror with such a mirror being defined as having a ratio of thickness over mean radius of curvature that is less than 1/50.

Downstream from the module 10, there is placed a dispersive grating 11 and two charge-coupled device (CCD) sensors 12 and 14 for picking up X-rays, respectively non-dispersed X-rays and dispersed X-rays.

A technique for manufacturing and integrating such mirrors is described in the above-mentioned article by D. de Chambure.

The problems raised by integrating such mirrors are the following:

- it is difficult to perform on-site measurements of the installed optical surfaces;
- the optical system is deformed as the mirrors are integrated, even though the mirrors need to be manufactured to their final specifications which are very tight, thereby giving rise to high costs;
- differential deformation due to different thermal expansion coefficients take place between the mirrors and the support during various stages: manufacture; integration; testing; and use; and
- it is difficult to bring all of the individual mirrors into proper alignment so as to cause their focuses to coincide.

The present invention proposes a method that enables integration to be improved and allows for final corrections to be made to the individual mirrors when building up a module.

Figure 2A:
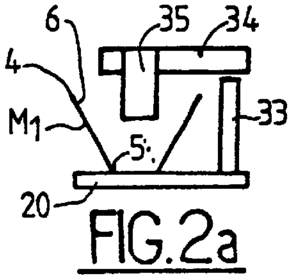
FIGS. 2*a* to 2*c* show the integration method of the invention.
Figure 2B:
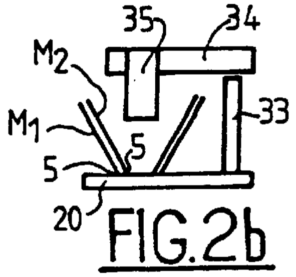
Figure 2C:
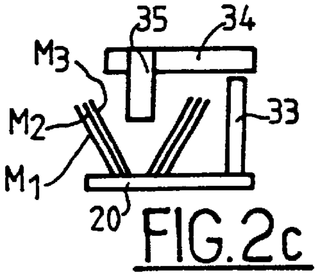

In the method, the mirrors are integrated on a support 20 in N successive stages, starting by the largest-dimension mirror $M_1$ (see FIG. 2*a*), i.e. the outermost mirror of the module 10, with the mirror having its first end or downstream end 5, i.e. its smaller-diameter end, placed on the support, and then proceeding step by step ($M_1$, $M_2$, $M_3$, . . . ) to the Nth mirror which is likewise stood on its downstream end 5 (see FIGS. 2*b* and 2*c*).

As a result, the internal reflecting surface 6 of each shell 1 that has just been integrated on the support 20 is still accessible for measuring the shell which has just been integrated, by using a device (34, 35) described below (with reference to FIG. 3) and for making any corrections.

It is possible to deform the support 20 so as to compensate for the additional load due to the weight of the individual mirrors as they are integrated in succession, or indeed to turn the support 20 in such a manner as to take account of any difference that might exist between the optical axis of a mirror to be integrated and the vertical axis.

The individual mirrors can be corrected by subjecting each mirror to ion polishing after it has been integrated. This makes it possible to compensate for manufacturing defects in the mirrors and/or for defects due to the integration process (shrinkage of adhesive, mechanical loading, etc. . . . ). Ion polishing presents the advantage of not degrading the microroughness of the polished surfaces, providing the rate of removal and the quantity of matter removed are kept within reasonable limits. This method of correction is also a method that avoids contact and does not have side effects.

One solution for reducing the deformation generated within the individual mirrors is to fix them via an interface region that is not active optically, thereby making it possible to attenuate stresses.

Figure 4:
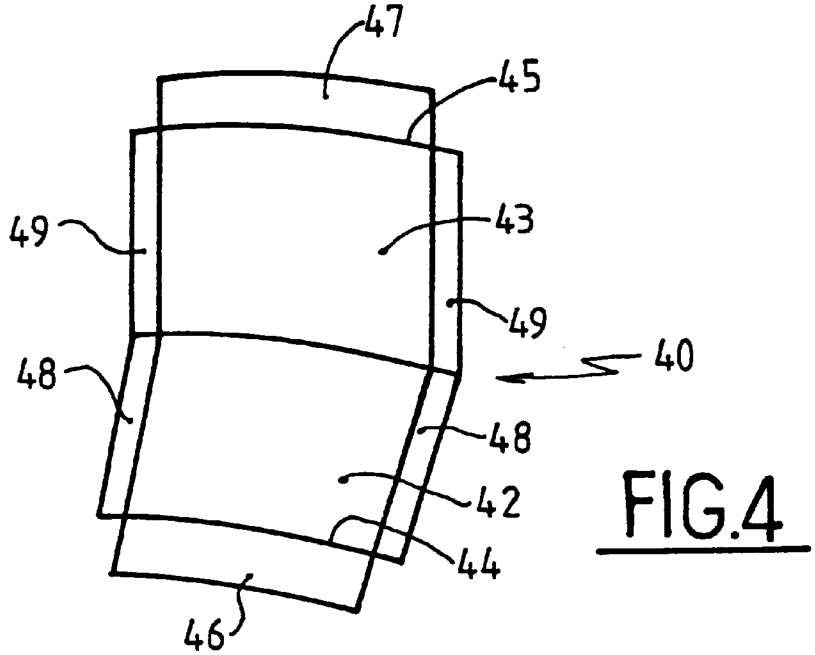
FIG. 4 shows one way of making a portion of an individual mirror.

For example, FIG. 4 shows an individual mirror of WOLTER I type which is made up of elements 40 constituting cylindrical segments occupying a fraction of a full turn, with each presenting a region 42 of parabolic section and a region 43 of hyperbolic section. The edge 44 of the region 42 is extended by a tab 46 for fixing to a part that covers the mirror assembly, while the edge 45 of the region 43 is extended by a tab 47 for fixing to the support 20. Laterally, and on at least one side, the regions 42 and 43 are extended by respective fixing tabs 48 and 49. These mechanical fixing tabs constitute ends which are integral with the individual mirrors.

Figure 5:
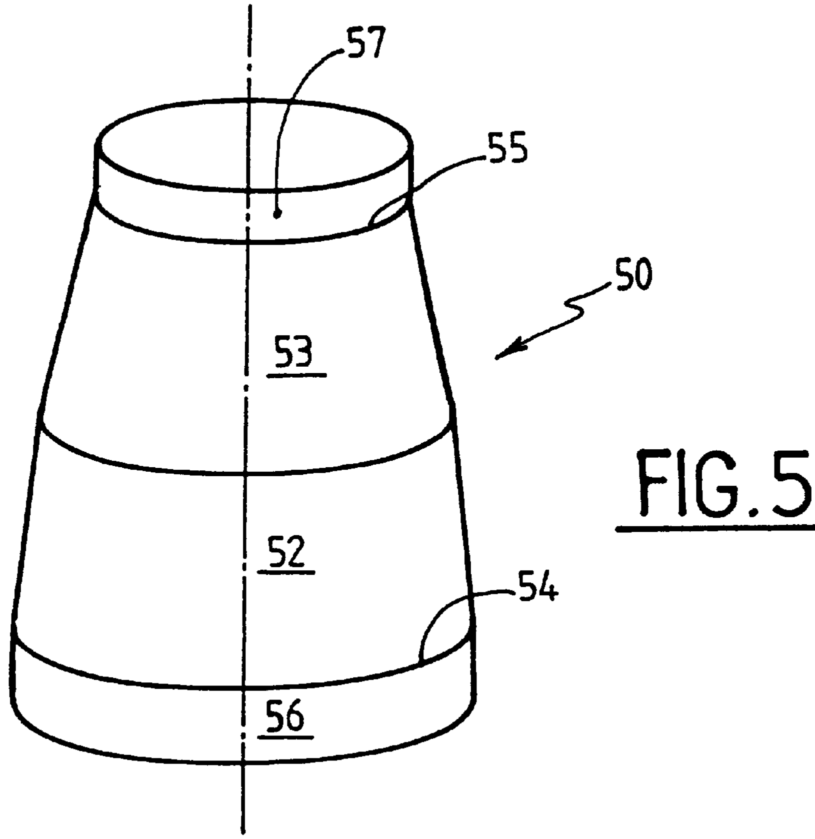
FIG. 5 shows one way of making an individual mirror.

FIG. 5 shows an individual mirror of the WOLTER I type that forms a complete cylinder, and that presents upstream and downstream fixing tabs 56 and 57, which are connected via upstream and downstream edges 54 and 55 to a region 52 of parabolic section and to a region 53 of hyperbolic section.

The tabs 46 to 49, 56, and 57 can enable temperature to be controlled very close to the optical system.

The tabs 46, 47, 56, and 57 also make it possible to limit the quantity of parasitic light that penetrates into the module.

The presence of parasitic, interfering light is inherent to telescopes having a grazing angle of incidence. In order to attenuate such parasitic light, it is known to place baffles or screens that are in co-alignment with the mirrors, and these baffles are difficult to manufacture and difficult to bring into alignment, so they are expensive and time consuming. One such optical baffle can be made integrally with an individual mirror, e.g. by electroforming. It is then possible after integration to treat the optical baffle situated at the upstream end 4, while the mirror is standing on its downstream end 5. This machining treatment for imparting controlled roughness to the inside surface of the baffle can be performed by ion machining, during the operation of applying ion machining to the reflecting surface of the mirror.

After an individual mirror has been integrated, it is possible to coat it in a conventional coating to give it characteristics of high reflectivity over a wide passband. Such coating is implemented by applying one or more layers, e.g. layers of metal.

The mirror support 20 (cf. FIG. 3) has a device 39 for compensating the deformation induced by the weight of the individual mirrors as they are integrated in succession. The support 20 carries a reference cylinder 33 which faces the optical surface 37' of the mirror 37 which has just been integrated and whose axis 33' is preferably parallel to the common optical axis X of the individual mirrors ($M_1$, . . . , $M_n$).

The mirrors are held at points that are distributed around their edges (possibly equally distributed) and they are lowered parallel to the axis X by using the cylinder 33 as a reference for the horizontal axes Y and Z so as to ensure that the mirror being integrated is deposited after following a required trajectory which enables it to be put down without touching any of the previously-integrated mirrors. It is possible to use the mirror-handling tool that is described in the article by D. de Chambure et al. entitled “The status of the X-ray mirror production for the XMM spacecraft”, published in SPIE Proceedings No. 2808, pages 362–375 (1966).

Once the mirror is in place, the topography of its active surface 37' is measured by scanning using contactless gauges, and the reference cylinder 33. Topography can also be measured by an optical test.

After a scan, the optimal position for the mirror 37 is calculated and the handling tools reposition it, should that be necessary.

The mirror 37 is then fixed in position by adhesive or by mechanical fixing, e.g. by screws. The handling tool is then decoupled from the mirror 37. At this moment, the weight of the mirror 37 is transferred to the support 20, thereby deforming it. This deformation is measured and the deformation device 39 produces compensation forces to return the support 20 to its initial state.

Nevertheless, it can happen that integration of the mirror 37 generates small errors of angle and small local deformations of the mirror, of the order of a few microns, in the vicinity of its anchor points.

These errors can be compensated by performing new measurements by scanning the topography of the mirror 37. The difference between the measured topography and the desired topography makes it possible to determine the quantity of material to be removed by ion machining, and thus to adjust the parameters of the ion machining. The measurement system 30 is then moved away and the machining head is put into place. It has an X, Y, Z positioning device for positioning the machining head relative to the reference cylinder 33. In a variant, the machining head can be mounted on the device for making measurements by scanning, which makes it possible to perform such machining immediately after the step of measuring topography.

It is also possible to provide a subsequent coating step, as mentioned above, made up of one or more layers, in particular metallic layers or organic layers. The coating head can be installed on the machining head, in which case the assembly can be part of a robot suitable for performing all of the operations (measuring topography, machining, coating) without interrupting the vacuum, thereby achieving optimum cleanness, and achieving significant time savings.

It is also possible at all times to test a mirror or a set of mirrors optically on a vertical axis, thereby minimizing deformation due to gravity, and to do so at various wavelengths using the procedure described in the article by J. P. Collette et al. “Performance of XMM optics and vertical test facility”, SPIE Proceedings, Denver, 1996.

Once a mirror has been integrated, it is possible to integrate the following mirror by repeating the entire sequence.

The support 20 can be tilted by a tilt device 38 for systems, in particular open-surface mirror systems, in which two successive mirrors can present different angles between their optical axes and the vertical.

Figure 3:
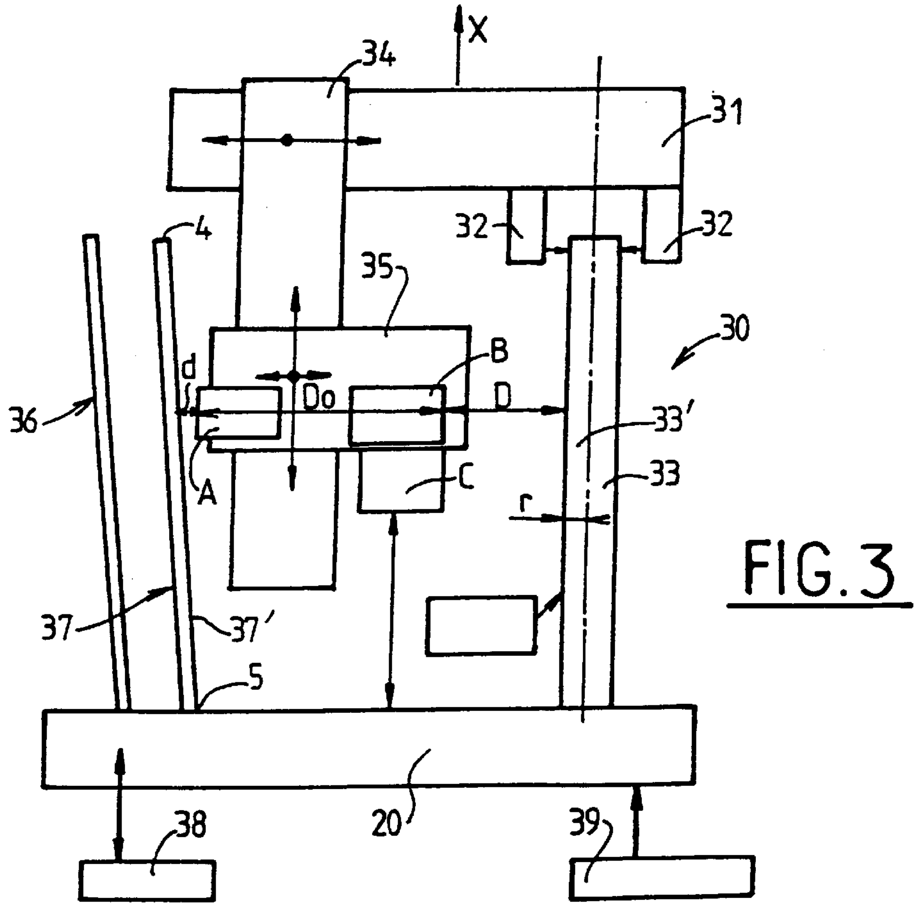
FIG. 3 shows a measuring device adapted to the method of the invention.

The scanner device 30 can be as shown in FIG. 3. It has a main plate 31 fitted with a centering sensor 32 of the contactless type for identifying the position of the plate 31 relative to the reference cylinder 33 standing on the support 20. The plate 31 is rotatable about an axis parallel to the axis 33' of the reference cylinder 33, thereby moving the measurement head in azimuth. The azimuth angle is measured by an angle sensor. The main plate 31 carries at least one arm 34 that is movable in translation along the longitudinal axis of the plate 31. The arm 34 carries a measuring plate 35 which is mounted on a bench fitted with two motors and which can be moved both vertically along the longitudinal axis of the arm 34, and horizontally The measuring plate 35 carries three sensors referenced A, B, and C. The sensor A is a short-range sensor, e.g. of the laser type, the magnetic type, or indeed the capacitive type, and it faces the optical surface 37' of the individual mirror 37 that is being integrated. While the optical surface 37' is being scanned, the displacements of the plate 35 are servo-controlled so that the distance d between the sensor A and the surface 37' remains constant, and thus so that the distance between the measurement plate 35 and the surface 37' remains constant.

The sensor B, e.g. of the laser type, serves to determine the distance D between the plate 35 and the reference cylinder 33. The distance between the optical surface 37' of the mirror and the axis 33' is thus equal to the distance d plus the (constant) distance $D_0$ between the sensors A and B, plus the distance D, plus the radius r of the reference cylinder 33.

The sensor C, e.g. of the laser type, serves to measure the Vertical distance between the measurement plate 35 and the support 20. The azimuth angle, and the values delivered by the sensors B and C are read at regular intervals, thereby making it possible to determine the (x, y, z) coordinates of the corresponding point on the surface 37' of the mirror 37.

As mentioned above, a plurality of arms can be carried by the plate 35 so that the assembly constitutes a robot for measuring, machining, and coating.

The plate 35 can carry an arm including the machining head, the coating head, and sensors B' and C' analogous to the sensors B and C. The sensor A is superfluous in the case given that at this time the topography of the surface of the mirror is known and positioning of the arm requires only values for the azimuth angle (provided by the plate 35) and data as measured by the sensors B' and C'.

The method of the invention can equally well be applied in part to surfaces that are not optical.

What is claimed is:

1. A method of assembling an optical assembly having an entrance longitudinal portion having an entrance end and an exit longitudinal portion having an exit end and comprising N coaxial shells forming individual mirrors having an internal reflecting surface, each of which extends between said entrance and said exit ends and presents a first diameter at said exit end and a second diameter that is greater than the first at said opposite, entrance end, the method comprising:

1) putting the exit end of the second shell situated outermost in the optical assembly into place on a support;

2) putting the exit end of the second shell which immediately adjacent thereto in the optical assembly into place on the support inside the first shell; and N) putting the exit end of the Nth shell which is situated innermost in the optical assembly into place on the support.

2. A method according to claim 1, wherein at least one of said operations of putting a shell into place comprises:

a) positioning one of said shells on the support;

b) measuring the topography of the inside surface of said shell as positioned on the support;

c) repositioning said shell on the support as a function of the result of said topography measurement; and c') fixing the position of said shell on the support.

3. A method according to claim 2, wherein said topographical measurement is implemented by differential measurement by scanning both the inside surface of said shell and a reference cylinder placed on the support in a reference position, said differential measurement being performed without making contact by means of sensors which are carried by a measurement plate whose displacements are identified relative to said reference cylinder.

4. A method according to claim 2, wherein at least one of said operations of putting a shell into place comprises, after said fixing on the support:

d) measuring the topography of the inside surface of said shell fixed on the support; and e) ion machining the inside surface of said shell as a function of the result of said topography measurement.

5. A method according to claim 4, comprising, after step e):

f) applying a reflective coating on the inside face of said shell.

6. A method according to claim 5, comprising, after step f):

g) optically verifying said shell.

7. A method according to claim 1, wherein at least one shell presents at least one extension integral with the shell and constituting a mechanical fixing element, which is placed at least one of its longitudinal ends.

8. A method according to claim 7, wherein at least one of said extensions disposed at one of said longitudinal ends constitutes a baffle for attenuating parasitic light interference.

9. A method according to claim 1, wherein at least one shell is constituted by a plurality of elements extending between the entrance and exit ends of said shell, each element occupying a portion of the outline of said shell, and wherein said elements present at least one extension integral with the shell and constituting a mechanical fixing element which is disposed at least one of the longitudinal ends thereof and at least one of the side edges thereof.

10. A method according to claim 8, wherein at least one of said extensions disposed at one of said longitudinal ends constitutes a baffle for attenuating parasitic light interference.

* * * * *

UNITED STATES PATENT AND TRADEMARK OFFICE

CERTIFICATE OF CORRECTION

PATENT NO. : 6,449,826 B1 Page 1 of 1
DATED : September 17, 2002
INVENTOR(S) : Robert Laine et al.

It is certified that error appears in the above-identified patent and that said Letters Patent is hereby corrected as shown below:

Title page,
Item [73], Assignee, after "Agence Spatiale Europeenne, Paris (FR)"; 2nd assignee should read -- Universite De Liege, Liege (BE) --

Signed and Sealed this

Fourth Day of February, 2003

JAMES E. ROGAN
*Director of the United States Patent and Trademark Office*